Nov. 1, 1927. 1,647,296
E. S. JEFFERIES
ELECTRICAL HEATING OF METAL STOCK
Filed Dec. 26, 1923  2 Sheets-Sheet 2
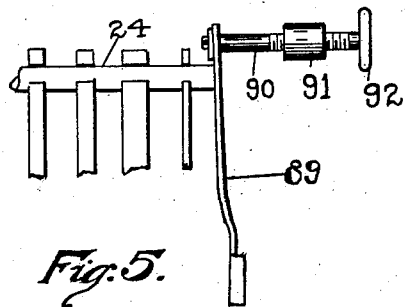
Fig. 5.
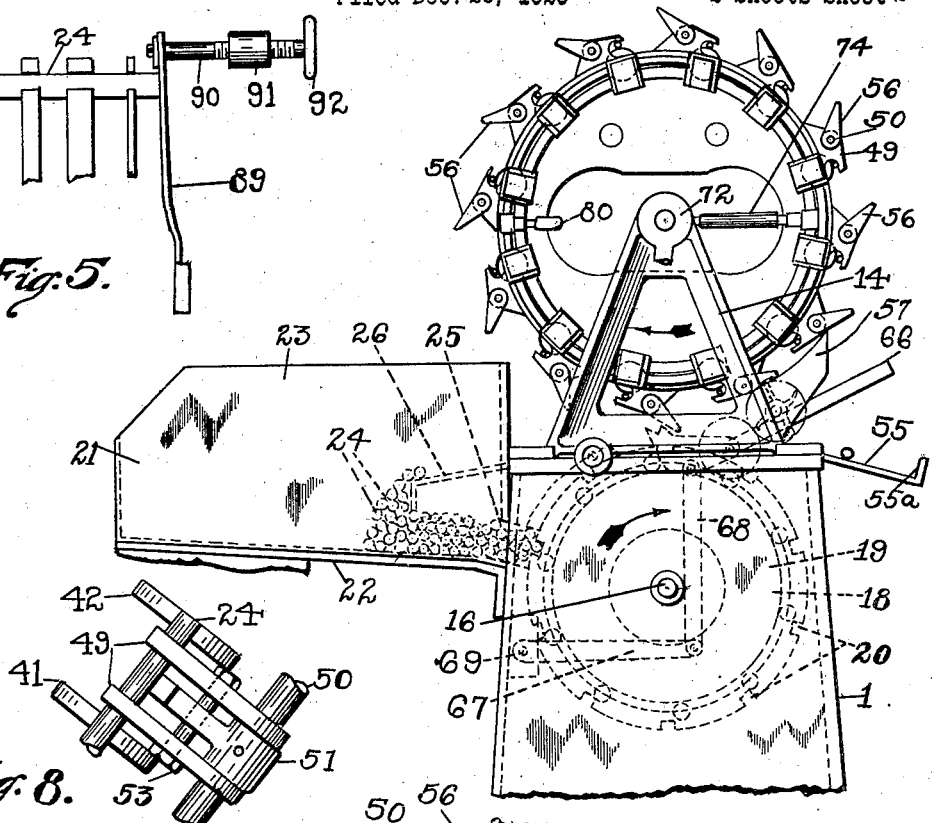
Fig. 2.
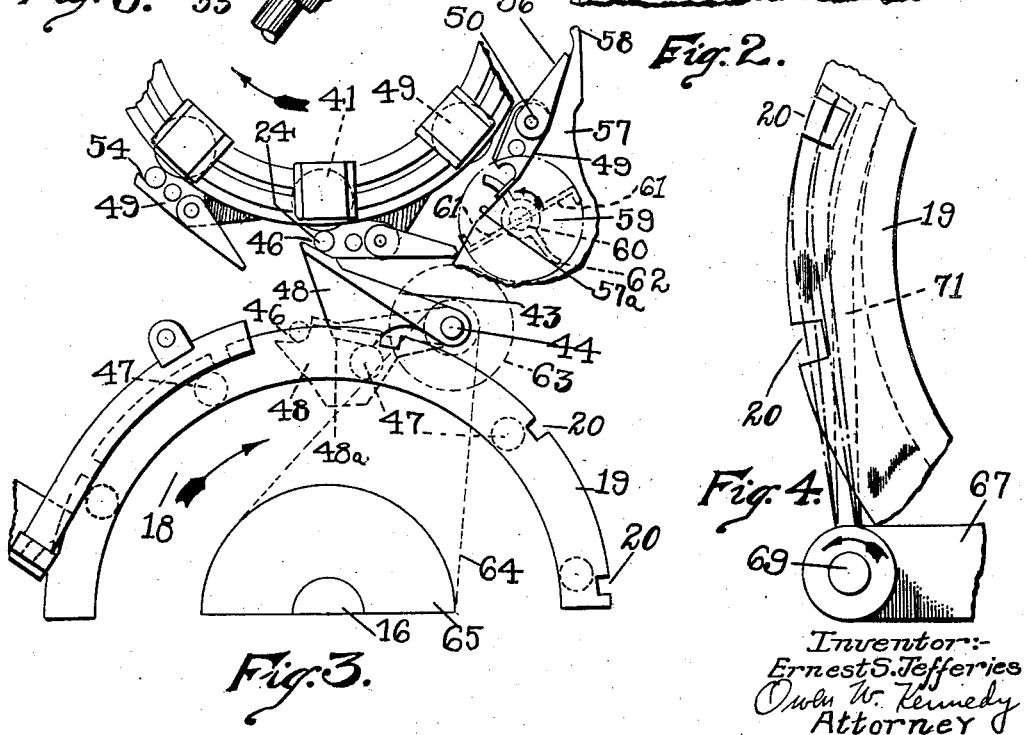
Fig. 8.
Fig. 3.
Fig. 4.
Inventor:-
Ernest S. Jefferies
Owen W. Kennedy
Attorney Patented Nov. 1, 1927.

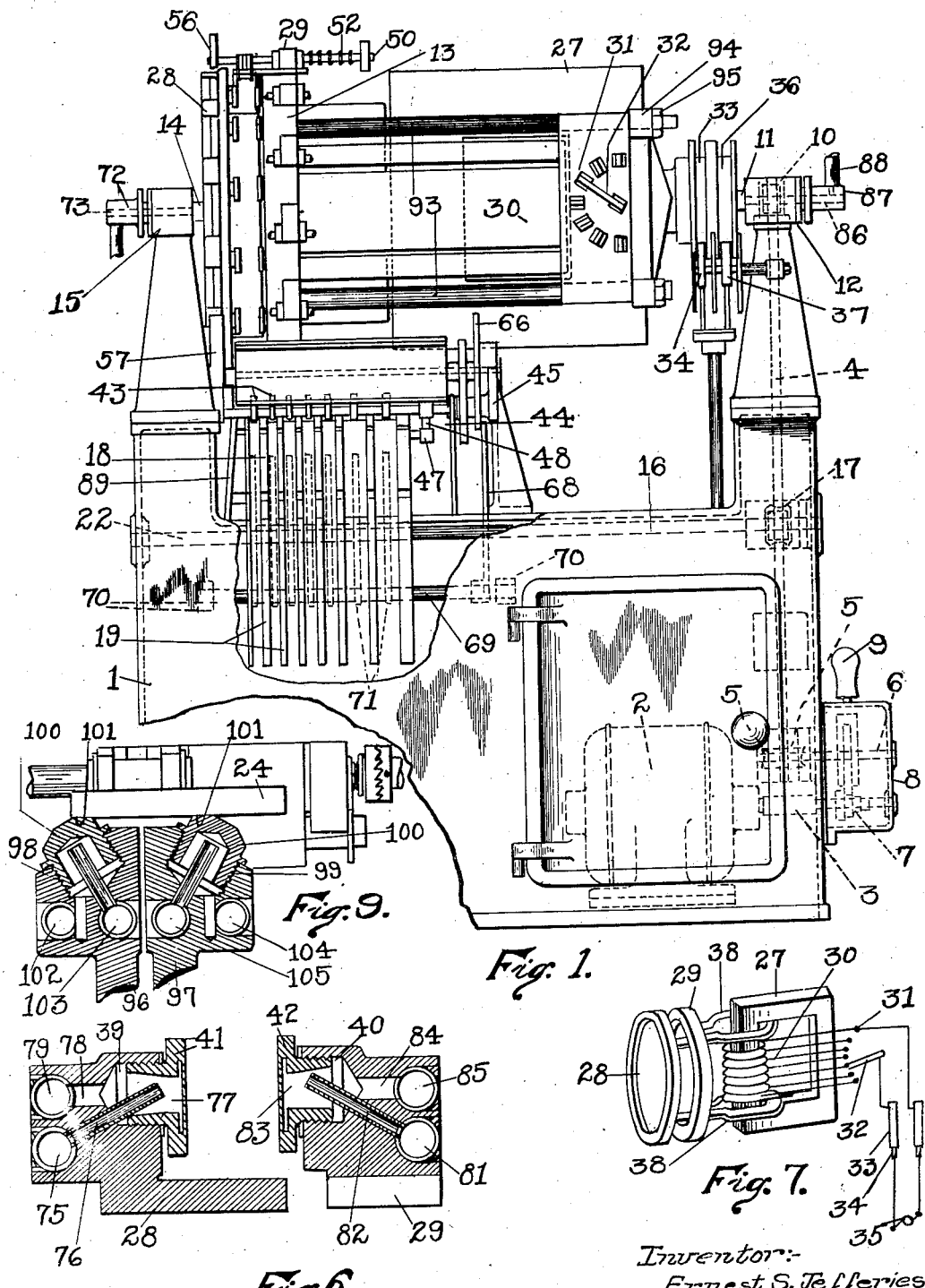

1,647,296

UNITED STATES PATENT OFFICE.

ERNEST S. JEFFERIES, OF HAMILTON, ONTARIO, CANADA, ASSIGNOR OF ONE-THIRD TO EBENEZER A. W. JEFFERIES, OF WORCESTER, MASSACHUSETTS.

ELECTRICAL HEATING OF METAL STOCK.

Application filed December 26, 1923. Serial No. 682,749.

My invention relates to the heating of metal and has for its object to provide an improved arrangement, entirely automatic in its operation, whereby a plurality of separate pieces of bar, or rod, stock are successively heated by the passage of an electric current therethrough, and whereby heated pieces of stock are discharged at regular intervals for the performance of some operation thereon, such as heading, or drop-forging.

In my copending application, Serial No. 578,836, filed July 31, 1922, there is shown and described an automatic machine for successively heating a number of pieces of stock and discharging the same at definite intervals, the machine being entirely automatic in its operation and requiring no handling of the material passing therethrough, after it has once been placed in the one, or more, feeding hoppers of the machine.

The present invention contemplates an improved manner of handling the stock before and during heating, and an improved machine differing radically, in its principle of operation, from the machine described in the above mentioned copending application. The machine of the present invention is characterized by its compactness and its ability, with a single operating mechanism, to heat simultaneously, a relatively large number of pieces of stock, as compared to the multiplicity of mechanisms required in my prior machine for heating a corresponding number of pieces. The present invention also contemplates improved means for regulating the amount and duration of the heating of the pieces of stock, and a particularly effective arrangement for cooling the electrodes with which the stock makes contact. The above and other advantageous features of my invention will hereinafter more fully appear, reference being had to the accompanying drawings in which Fig. 1 is a view in side elevation of a machine embodying my invention.

Fig. 2 is a view in end elevation of the machine shown in Fig. 1.

Fig. 3 is a fragmentary view showing, on an enlarged scale, a portion of the transfer mechanism shown in Fig. 2.

Fig. 4 is a fragmentary view showing details of the stock feeding mechanism shown in Fig. 2.

Fig. 5 is an enlarged detail view showing a portion of the magazine shown in Fig. 1.

Fig. 6 is a transverse sectional view showing the cooling arrangement for the electrodes shown in Fig. 1.

Fig. 7 is a diagrammatic view showing the electrical connections of the rotating electrode and transformer structure shown in Fig. 1.

Fig. 8 is a fragmentary plan view showing one of the clamping devices of the electrode structure.

Fig. 9 is a sectional view similar to Fig. 6, showing a modification of the construction of the electrodes.

Like reference characters refer to like parts in the different figures.

Referring now to Figs. 1 and 2, the machine generally comprises a base 1, within which is located an electric motor, or other suitable source of power 2, providing a rotating shaft 3. A driving shaft 4 extends upwardly through the base 1 and is connected to the power shaft 3 through worm gearing 5, a countershaft 6 and suitable change speed gearing 7 enclosed within a box 8. A handle 9 is provided for operating the gearing 7, so that the shaft 4 may be conveniently driven at different speeds. It is to be understood, however, that other suitable means may be employed for varying the speed of the shaft 4.

The upper end of the shaft 4 is connected through worm gearing 10 to a shaft 11 rotatably supported in a bearing 12 extending upwardly from the base 1. The shaft 11 serves to support one end of the rotatable electrode structure of my machine, which structure is generally designated by the reference numeral 13, and will be hereinafter described in detail. The other end of the structure 13 is carried by a shaft 14, and rotatably supported in axial alinement with the shaft 11 by a bearing 15. Rotation of the shaft 4 is adapted to drive the electrode structure 13, as a unit.

A shaft 16 extends through the base 1 below and parallel to the shafts 11 and 14 and is connected to the shaft 4 by suitable worm gearing 17. The shaft 16 carries a feeder drum 18, and rotation of the shaft 4 is adapted to drive the drum 18 in the same direction of rotation that the electrode structure 13 is driven, as indicated by the arrows in Fig. 2, and at the same speed. The simultaneously rotating electrode structure 13 and the drum 18 constitute the essential elements of my machine, the drum 18 being adapted to support a plurality of pieces of stock in a pre-heating position, while the electrode structure 13 is adapted to remove the pieces from the drum 18 and support them, while an electric current is being passed therethrough, for a predetermined length of time, as will hereinafter appear.

As best shown in Figs. 2 and 3, the feeder drum 18 consists of a plurality of spaced annular members 19, each of which is provided around its periphery with a number of spaced notches 20, the notches 20 of one member 19, being in alinement with the notches 20 of the members 19 on either side thereof. The drum 18 thus constitutes in effect, a skeleton structure cylindrical in form, and providing a number of circumferentially arranged notches or seats extending longitudinally thereof, for receiving and supporting pieces of stock from a supply hopper 21.

The hopper 21 consists of an inclined bottom 22 with walls 23 extending upwardly a sufficient distance to confine a large number of pieces of stock 24, which extend in substantial parallelism within the hopper. The front wall 23 of the hopper adjcent the feeder drum 18 is provided with an opening 25 which permits the passage of a limited number of pieces of stock therethrough to the feeder drum 18. As clearly shown in Fig. 2, the unnotched portions of the members 19 are adapted to support the pieces of stock which emerge from the opening 25, and as the drum 18 rotates, a single piece of stock will be positioned in each of the notches 20 as the notches successively pass into the proximity of the hopper opening. A dam member 26 extends from the wall of the hopper 21 in advance of the opening 25 and prevents too great an accumulation of the pieces of stock around the opening 25, as clearly shown in Fig. 2. It is now apparent that rotation of the drum 18 will cause pieces of stock to be positioned in successive notches 20, and that the pieces thus seated will be carried upwardly from the hopper opening 25 in the direction of the rotating electrode structure 13, which will next be described.

Referring now to Figs. 1, 6 and 7, the electrode 13 consists generally of a magnetic core 27 and spaced annular electrodes 28 and 29, all adapted to rotate as a unit with the shafts 11 and 14. As best shown in Fig. 7, the core 27 is rectangular in form, although other forms may be employed, and one leg thereof is surrounded by a primary winding 30 having a number of taps which are brought out to the contacts 31 of a control switch having a movable arm 32. The arm 32 is connected to a collector ring 33 surrounding the shaft 11, to which current is conducted through a brush 34 from a suitable source of electrical energy, indicated at 35. One terminal of the winding 30 is connected directly to a second collector ring 36 which is connected through a brush 37 to the source 35. With the connections as shown, it is obvious that any desired number of turns of the primary winding 30 may be energized to vary the voltage induced in the secondary winding of the transformer, which will now be described.

The secondary winding consists of open loops 38 passing around the core 27, one end of each loop 38 being connected to the annular electrode 28, while the other end thereof is connected to the annular electrode 29. As the electrodes 28 and 29 are spaced apart, as clearly shown in Figs. 6 and 7, it is obvious that the one or more secondary circuits of the transformer are incomplete in the absence of any electrical connection between the electrodes 28 and 29. If however, a conductor, such as one of the pieces of stock shown in the hopper 21, should be placed across the electrodes 28 and 29, it is obvious that a heavy short circuit current will flow through the secondary winding, that portion of the piece of stock between the electrodes 28 and 29, being included in the circuit. It is also obvious that the intensity of the secondary current will depend largely upon the secondary voltage, and that this in turn will depend upon the number of turns of the primary winding 30 which are energized.

As best shown in Fig. 6, the electrodes 28 and 29 are provided on opposite faces thereof with spaced openings 39 and 40 respectively. The openings 39 are threaded to receive a plurality of contacts 41, each of which is provided with an enlarged head extending beyond the periphery of the electrode 28. The openings 40 are similarly threaded to receive contacts 42, each of which is also adapted to extend beyond the periphery of the electrode 29. As the holes 39 and 40 which receive the contacts 41 and 42 are substantially in alinement, the contacts 41 and 42 present a number of pairs of projecting contact surfaces spaced around the periphery of the electrodes 28 and 29, and means which will now be described, are provided for transferring pieces of stock from the slots 20 of the drum 18 to positions in engagement with different pairs of contacts 41 and 42.

Referring now to Fig. 3, a number of transfer fingers 43 are mounted in spaced relation on a shaft 44 that is rotatably supported between the electrode structure 13 and the drum 18 in bearings 45, shown in Fig. 1. The fingers 43 are spaced apart substantially the same distance as the drum members 19, and in staggered relation thereto, so that when the shaft 44 is turned in a counterclockwise direction, the fingers 43 are adapted to extend between the members 19, as indicated in dotted lines in Fig. 3. Each finger 43 is provided at its end with a notch 46, the bottom of which is substantially in alinement with the bottom of a notch 20 in one of the members 19 in the lower or dotted line position of the finger 43. Consequently, as the drum 18 rotates in the direction of the arrow, a piece of stock 24, seated in the alined notches 20, is transferred to the alined notches 46 of the then stationary fingers 43 as the latter pass between the members 19.

As a piece of stock carried in a set of notches 20 reaches a position over the ends of the fingers 43, a roller 47 carried by the drum 18 engages a cam 48 carried by the shaft 44 beyond the drum 18. Continued movement of the roller 47 against the cam 48 causes the shaft 44 to be turned in a clockwise direction, thereby raising all of the fingers 43 from their position between the members 19, and carrying with them the piece of stock seated in the notches 46. The fingers 43 are shown in the raised position in full lines in Fig. 3, the roller 47 then being nearer the end of the working surface of the cam 48. As clearly shown in Fig. 3, the rollers 47 are spaced around the drum 18 substantially the same distance as the slots 20, each roller being angularly displaced behind a set of slots 20, so that a particular roller will not engage the cam 48 until after the piece of stock in the corresponding set of slots 20 has been transferred to the arms 43.

As the transfer fingers 43 are raised to the full line position of Fig. 3, they carry with them a piece of stock 24 and place a portion of the piece in engagement with a pair of contacts 41 and 42 on the electrodes 28 and 29. The simultaneous rotation of the electrode structure 13 and the drum 18 is so timed that a pair of contacts 41 and 42 arrive in position to receive a piece of stock just as the fingers 43 reach their uppermost position. The fingers 43 remain in this position for an appreciable time, while a given roller 47 remains in engagement with the surface 48ª of the cam 48, thereby affording opportunity for the piece of stock to be clamped in engagement with the contacts 41 and 42 by the clamping members 49.

As best shown in Fig. 8, the clamping members 49 are arranged in pairs around the periphery of the electrode structure, each pair of clamping members being pivotally mounted on a shaft 50 extending parallel to the axis of rotation of the electrode structure adjacent a pair of contacts 41 and 42. The clamping members 49 are loosely mounted on the corresponding shaft 50, which is provided with a lever 51 extending between the members 49 and adapted to turn with the shaft 50. Each shaft 50 is extended beyond the electrode 29, as best shown in Fig. 1, and is surrounded by a coiled spring 52 which is adapted to turn the shaft 50 and the lever 51 in the direction of a pair of contacts 41 and 42. The turning movement of the lever 51 is transmitted to the clamping members 49 through a pin 53 extending transversely through the lever 51 and adapted to engage the members 49. The pressure of the spring 52 is thus transmitted through both clamping members so that the latter press a piece of stock into engagement with a pair of contacts 41 and 42 with an equal pressure. Each clamping member 49 is provided with a notch 54 adapted to receive a piece of stock as it is held in the path thereof by the transfer fingers 43, as clearly shown in Fig. 3.

From the foregoing, it is apparent that as the electrode structure rotates, a pair of clamping fingers 49 is adapted to remove a piece of stock from the transfer fingers 43 and hold one end portion thereof in close engagement with a pair of contacts 41 and 42. When a piece of stock is so held, the portion thereof between the contacts 41 and 42 completes the circuit between the electrodes 28 and 29 at that particular point, so that a heavy secondary current will then flow through the piece of stock. Further rotation of the electrode structure will carry the piece of stock away from the feeder drum, during which time current will continue to flow through that portion of the piece between the electrodes 41 and 42, thereby heating the same. When a piece of stock held in heating position by a particular pair of clamping members 49 is nearly made to complete the revolution, the clamping fingers are adapted to release the piece and deliver it to a receiving table 55, see Fig. 2, which will now be described.

The end of each shaft 50 is provided with an operating arm 56 which is normally held by the spring 52 in the position shown in Fig. 2, that is with the clamping members 49 holding a piece of stock in heating position. A cam plate 57 is carried on a stationary portion of the machine frame and is in the path of movement of the operating arm 56 as the electrode structure revolves. When an operating arm 56 engages the cam plate 57, it turns the corresponding shaft 50 in a counterclockwise direction, as viewed in Fig. 3, thereby moving the corresponding pair of clamping members 49 away from the contacts 41 and 42 and thus withdrawing a piece of stock from the contacts, so that the piece is free to fall by gravity from the members 49. The cam plate 57 is provided with a projection 58 which is adapted to move the clamping members 49 to their extreme position away from the contacts 41 and 42, and then suddenly release the members so that the spring 52 may move the members 49 backwards a short distance. This quick movement of the members 49 results in a slight shock being imparted thereto, which shakes the heated piece of stock loose from the members 49 should it tend to stick thereto.

When a heated piece of stock is released from the clamping members 49, it falls by gravity to a stock catcher 59 rotatably mounted on a shaft 60. The stock catcher 59 consists of a pair of diametrically disposed fingers 61, each bent up at its end to form a notch to receive a piece of stock falling from the clamping members 49, as clearly shown in Fig. 3. As the catcher revolves, a piece of stock carried by a given set of fingers is free to fall from the fingers as they reach their lowermost position upon the receiving table 55. The table 55 is illustrated as being downwardly inclined, so that the pieces of stock dropped thereon roll to its outer edge, which is provided with an upturned lip 55ª. The heated pieces of stock are adapted to lie along the edge of the table 55, from which they may be removed by any suitable means for the performance of a forming operation thereon, such as heading, or drop forging.

The catcher 59 is also provided with kick-off arms 62, angularly spaced in respect to the fingers 61 and adapted to pass between successive pairs of clamping members 49 as the electrode structure revolves. The arms 62 are adapted to clear a piece of stock from a pair of clamping members 49 should it tend to stick to the fingers after being removed from the contacts. The catcher 59 is adapted to revolve in synchronism with the electrode structure and feeder drum, but in the opposite direction of rotation with respect thereto, as indicated by the arrow. As illustrated, the catcher shaft 60 is connected by gear 63ª to a gear 63ᵇ loosely supported on the transfer shaft 44, which is in turn connected by a chain 64 to a suitable sprocket wheel 65 mounted on the feeder drum shaft 16, although it is to be understood that the catcher 59 may be driven by any other suitable gearing.

In order to interrupt the transfer of pieces of stock from the drum to the electrode structure, a cut-off lever 66 is pivotally mounted on the transfer shaft 44, to the end of which is connected a rocker arm 67 by means of a link 68. The arm 67 is adapted to turn a shaft 69, extending the length of the feeder drum and rotatably mounted at its ends in bearings 70, as shown in Fig. 1. The shaft 69 carries a number of spaced fingers 71, which normally extend between the members 19 inside of the notches 20, as shown on a large scale in Fig. 4. When the lever 66 is moved downwardly, the arm 67 is raised, thus turning the shaft 69 in a counterclockwise direction, as viewed in Fig. 2. This movement of the shaft 69 causes the fingers 71 to move into the extreme dotted line position shown in Fig. 4, thus preventing the pieces of stock from emerging from the opening 25 of the hopper 21 into the notches 20. The lever 66 is thus operated to interrupt the supply of stock to the feeder drum; continued rotation of the drum will cause only one more piece of stock to be transferred to the electrode structure. Obviously, the lever 66 may be so operated as to permit the reception of pieces of stock to the feeder drum only at desired intervals.

The cut-off lever 66 has also another function in preventing the entrance of two more pieces of small size stock into the notches 20 of the feeder drum. For this purpose, the lever is moved downwardly only part way, so that the fingers 71 then occupy the intermediate position shown in dot and dash lines in Fig. 4. With the fingers 71 in this intermediate position, the notches 20 are only partially closed, so that a single piece of small size stock can enter a given series of notches 20, while a second piece would be excluded therefrom.

Referring now to Figs. 1 and 6, there is illustrated my improved arrangement for cooling the electrodes carrying the heating contacts 41 and 42. Water is supplied to the rotating electrode structure through a gland 72 at one end of the shaft 14, from which water passes through a duct 73, in the shaft 14, and a radial hose connection 74 (see Fig. 2) to an annular passage 75 in the front electrode 39. A plurality of ducts 76 connect the passage 75 to chambers 77 provided in the contacts 41. Outlet ducts 78 are provided between the chambers 77 and an annular passage 79 surrounding the passage 75. The outer passage 79 of the front electrode 39 is connected by a hose 80 (see Fig. 2) to an annular passage 81 provided in the rear electrode 29. Inlet ducts 82 connect the passage 81 to chambers 83 provided in the contacts 42, while outlet ducts 84 connect the chambers 83 to an annular passage 85 concentric with the passage 81. The outer passage 85 of the electrode 29 is connected by a radial pipe, not shown, to a passage 86 in the center of the shaft 11, from which the water is discharged from the machine through a gland 87 and outlet pipe 88. With the above described arrangement, it is apparent that water will circulate freely through the entire electrode structure, and it will be noted that the inlet ducts 76 and 82 are inclined upwardly, so that the water will have direct access to those portions of the contacts 41 and 42 near their points of engagement with the pieces of stock.

Referring now to Fig. 5, there is shown an arrangement for alining pieces of stock with the front electrode 28 in advance of transferal of the stock to the electrode structure. A guide member 89 is mounted on a stationary portion of the machine and extends upwardly to a point adjacent the top of the feeder drum. The upper end of guide member 89 is maintained in alinement with the series of contacts 41, see Fig. 1, so that as the piece of stock is carried by the feeder drum from the hopper opening 25 to its transfer position, its end is pushed into alinement with the contacts 41 by the guide 89. The position of the end of the guide 89 can be adjusted by means of a screw 90 having its end portion connected to the guide. The screw 90 is in threaded engagement with a stationary lug 91 and provided with an operating portion 92, whereby it may readily be turned to vary the position of the guide 89.

The distance between the electrodes 28 and 29 is adapted to be adjusted by means of bolts 93 extending longitudinally across the electrode structure, the ends of which are in threaded engagement with the electrode 29. The bolts 93 are turnable in stationary lugs 94 and lock nuts 95 are provided on the bolts 93, in order to lock the same in position after an adjustment. By means of this adjustment, it is possible to vary the length of those portions of the pieces of stock which are included in the circuit between the respective pairs of contacts 41 and 42.

Referring now to Fig. 9, there is shown a modification of the electrode structure, in which the electrodes 96 and 97 are each provided with threaded openings 98 and 99, oppositely inclined with respect to each other. Contacts 100 are screwed into the openings 98 and 99, each contact 100 providing a flat face 101 extending substantially parallel to the axis of rotation of the electrode structure. The individual pieces of stock are adapted to be held in engagement with the faces 101 of alined pairs of contacts 100, by the clamping members 49 previously described. The electrode 96 is provided with annular ducts 102 and 103 connected to the interior of the contacts 100, while the electrode 97 is similarly provided with ducts 104 and 105 connected to the interior of the contacts 100. A cooling medium is adapted to circulate through the ducts and the contacts, as described with reference to Fig. 6. With this modified arrangement, the electrode structure is extremely compact and the contacts 100 are particularly well adapted to withstand the forces imposed thereon by the pressure of the clamping members 49.

Having thus described the various parts entering into my invention and their manner of functioning, the operation of my machine as a whole will now be considered. Pieces of stock 24, of any desired size, are first placed in the supply hopper 21, whereupon a number of pieces will roll down the inclined bottom 22 to the opening 25. Assuming that the motor 2 is operating, it is apparent that when a given series of notches 20 of the rotating feeder drum comes opposite to the opening 25, a piece of stock will be received therein and will be carried upwardly away from the hopper in the direction of the rotating electrode structure. The electrodes 28 and 29 are at that time unconnected and so the secondary circuit of the rotating transformer structure is incomplete.

The transfer fingers are at this moment in their lower dotted line position, as shown in Fig. 3, and as the piece of stock in the notches 20 is carried over the notch 46, the piece of stock is transferred to the fingers 43. At this moment the roller 47, corresponding to the series of notches 20 in which the piece of stock has been carried, engages the cam 48 and lifts the fingers 43 into the position shown in full lines in Fig. 3, in which position it is in the path of movement of a pair of clamping members 49 carried by the rotating electrode structure. As a pair of fingers 49 approaches the piece of material held by the fingers 43, the members 49 are held away from the corresponding pair of contacts 41 and 42 by reason of the fact that the operating arm 56 of the fingers is still in engagement with the surface 57ª of the cam plate 57. As the piece of material is engaged by the members 49, the arm 56 passes off the surface 57ª, thereby allowing the spring 52 to press the members 49 into engagement with the corresponding pair of contacts 41 and 42, in which position the piece of stock is carried away from the fingers 43 by the rotation of the electrode structure.

While the transfer of a piece of material as described above has been going on, a second piece of material has entered the next succeeding series of notches 20, so that by the time the transfer of the first piece is completed, the fingers 43 have fallen to their lower position in time to remove the second piece of material from its notch. Obviously, the second piece of material is transferred to the next succeeding pair of contacts 41 and 42 by the operation just described with reference to the first piece, and it is apparent that so long as both the feeder drum and the electrode structure are rotated in unison, pieces of material will be carried from the hopper by the drum and transferred to a position in engagement with a pair of contacts 41 and 42.

As soon as the piece of material is clamped in engagement with a pair of contacts 41 and 42, the secondary circuit of the transformer is completed between that particular pair of contacts, whereupon a heavy short circuit current will flow through that portion of the piece of material between the contacts. Obviously, each succeeding piece of material that is clamped to succeeding pairs of contacts will be similarly heated by the passage of current therethrough.

The piece of material first considered will be heated while it is passing from a position just above the place of transfer to a position in which the operating arm 56 of the corresponding shaft 50 encounters the cam plate 57, whereupon the clamping members 49 will be moved away from the contacts and release the heated piece of material. The piece of material is then free to fall upon a finger 61 of the rotating catcher 59, from which it is dropped to the receiving table 55. In case the heated piece of stock should tend to stick to the clamping members 49, a kick-off arm 62 of the catcher will pass between the clamping members 49 and remove the heated piece of material therefrom. It is apparent that succeeding pieces of stock will be heated as they are carried from the place of transfer by the rotation of the electrode structure to the point at which they are released and fall upon the table 55.

The degree to which the pieces of stock are heated as they are carried around by the rotation of the electrode structure is determined by the rate of angular movement while in engagement with the contacts, and by the voltage induced in the secondary winding of the transformer. Obviously, the speed of rotation of the electrode structure can be readily varied by means of the speed changing gearing 7, while the voltage induced upon the secondary winding can be readily varied by means of the switch arm 32, the position of which determines the number of turns of the primary winding 30 that are energized. The portion of the total length of each piece which is heated by the passage of current is readily adjusted by means of the bolts 93 and lock nuts 95, as previously described.

As the electrode structure rotates with one or more pieces of material clamped between one or more pairs of contacts 41 and 42, the electrodes and the contacts are effectively cooled by the circulation of water through the entire structure, as clearly described with reference to Figs. 1 and 6. By this circulation of a cooling medium, the entire electrode structure is kept at a safe temperature, while the individual contacts 41 and 42 are so cooled by the passage of water therethrough that fusing between the contacts and the pieces being heated is substantially eliminated.

If at any time during the operation of the machine, it is desired to interrupt the supply of pieces of material to the feeder drum 18, it is only necessary to depress the lever 66, whereupon the fingers 71 will prevent any more pieces of material from entering the notches 20. In this way a number of pieces can be fed to the electrode structure for the purpose of determining the degree to which the pieces are heated to allow the machine to heat the pieces continuously.

From the foregoing, it is apparent that by my invention I have provided an improved manner of heating metal bar, or rod stock, and an improved machine, entirely automatic in its operation, for handling the stock before, and during heating. The salient features of my invention reside in first supporting a plurality of separate pieces of stock in preheating positions simultaneously with their movement with respect to an electrode structure, and then successively supporting the pieces of stock in heating positions simultaneously with movement of the stock with respect to a suitable device for receiving the heated material. The above described procedure through which the pieces of stock pass is characterized by the fact that each piece of stock always remains parallel to its initial preheating position, throughout its entire movement. The machine being entirely automatic in its operation, the progress of each separate piece of stock therethrough is precisely the same as the preceding piece, so that the stock is heated uniformly in degree. Obviously, the degree and rate of heating, as well as the intervals between the release of the heated pieces, can be varied, as previously pointed out.

I claim:

1. In a rotary metal stock heater, a rotatable structure comprising spaced annular electrodes, secondary conductors attached to said electrodes, primary windings magnetically operable on said secondary, contacts on said electrodes, clamping means to clamp stock on said contacts, and means feeding stock to said contacts and clamping means.

2. In a rotary metal stock heater, a rotatable structure comprising spaced annular electrodes, secondary conductors attached to said electrodes, primary windings magnetically operable on said secondary, brushes and rings to convey current to said primary, contacts on said electrodes, clamping means to clamp stock against said contacts, and means feeding stock to said contacts and clamping means.

3. In a rotary metal stock heater, a rotatable structure comprising spaced annular electrodes, secondary conductors attached to said electrodes, a magnetic core around which said secondary conductors pass, a primary winding on said magnetic core, contacts on said electrodes, clamping means on said contacts, and means feeding stock to said contacts and clamping means.

4. In a rotary metal stock heater, a rotatable structure carrying spaced annular electrodes, secondary conductors electrically connected to said electrodes, a magnetic core around which said electrodes pass, a primary winding on said magnetic core, a plurality of sets of contacts carried by said electrodes, clamping means in connection with said contacts, means to open and close said clamping means, and automatic means feeding stock to said clamping means, whereby to successively heat pieces of metal stock.

5. In a machine of the class described, means for supporting a plurality of pieces of stock in a predetermined order, an electrode structure providing a plurality of pairs of contacts, and means controlled by simultaneous rotative movement of said supporting means and said electrode structure for moving pieces of stock from said supporting means into engagement with said contacts and for automatically releasing said pieces of stock from said contacts after being heated a predetermined amount.

6. In a machine of the class described, a rotatable feeder drum for supporting a plurality of pieces of stock, a rotatable electrode structure providing a plurality of pairs of contacts, and means controlled by rotational movement of said drum and said electrode structure for transferring pieces of stock from said drum to positions between pairs of contacts.

7. In a machine of the class described, a rotatable feeder drum for supporting a plurality of pieces of stock, a rotatable electrode structure providing a plurality of pairs of contacts, and means controlled by rotational movement of said drum and said electrode structure for transferring pieces of stock from said drum to positions between pairs of contacts, and further means for removing pieces of stock from said contacts after being heated a predetermined amount.

8. In a machine of the class described, a rotatable feeder drum for supporting pieces of stock in spaced angular relation and a rotatable electrode structure providing a plurality of pairs of contacts in spaced angular relation corresponding to the arrangement of the stock on said drum.

9. In a machine of the class described, a feeder, a drum, for supporting pieces of stock and an electrode structure providing a plurality of pairs of contacts, and means controlled by relative movement between said feeder and said drum for lifting a piece of stock from said feeder into a position in engagement with a pair of said contacts.

10. In a machine of the class described, a movable feeder for supporting pieces of stock and a movable electrode structure providing a plurality of pairs of contacts, transformer means to supply current to said electrodes, said transformer means being part of said movable structure, and a mechanism operating in timed relation with the movement of said feeder and said electrode structure for transferring a piece of stock from said feeder into engagement with a pair of contacts.

11. In a machine of the class described, a rotatable structure comprising a closed magnetic core, a primary winding for energizing the same, and an open secondary winding constituted, in part, by spaced annular electrodes, said electrodes adapted to receive and hold members so as to close said secondary winding.

12. In a machine of the class described, a rotatable structure comprising a closed magnetic core, a primary winding for energizing the same, and an open secondary winding constituted in part by spaced annular electrodes, carrying a plurality of pairs of oppositely disposed contacts, said electrodes adapted to receive and hold members so as to close said secondary winding.

13. In a machine of the class described, an electrode structure comprising spaced annular electrodes each provided with a plurality of hollow contacts, and means for causing the circulation of a cooling medium around said electrodes and into each of said contacts.

14. In a machine of the class described, containing means for containing pieces of stock, a feeder drum for removing pieces of stock, one by one, from said containing means, and means for preventing the reception of pieces of stock by said drum.

15. In a machine of the class described, an electrode structure providing a pair of spaced contacts, a pair of clamping members free to turn on a shaft, an operating member turnable with said shaft, and means for imparting a rotative movement to said shaft to cause said operating member to exert equal pressures on said clamping members.

16. In a machine of the class described, an electrode structure providing a pair of spaced contacts, a rotatable feeder for supporting a plurality of pieces of stock, and means for alining the ends of said pieces with one of said contacts.

17. In a machine of the class described, an electrode structure providing a pair of spaced contacts, a rotatable feeder for supporting a plurality of pieces of stock, and means controlled by the rotation of said feeder for successively alining the ends of said pieces with one of said contacts.

18. In a machine of the class described, an electrode structure providing a pair of spaced contacts, a rotatable feeder for supporting a plurality of pieces of stock, and a guide member in alinement with one of said contacts for successively alining the ends of said pieces.

19. In a machine of the class described, an electrode structure providing a pair of spaced contacts, a rotatable feeder for supporting a plurality of pieces of stock, and a guide member in alinement with one of said contacts for successively engaging the ends of said pieces as the feeder rotates and thereby alining them.

20. The improvement in heating metal, which consists in supporting and moving a plurality of pieces first in preheating positions on one axis of rotation and then while being heated on another axis of rotation.

21. In a machine of the class described, a rotatable element providing supporting means for a plurality of pieces of stock, and a second element providing a plurality of pairs of contacts, and means whereby simultaneous rotation of the elements brings about a transfer of pieces of stock from one element to another.

22. In a machine of the class described, a rotatable element providing supporting means for a plurality of pieces of stock, and a second element providing a plurality of pairs of contacts, and means whereby rotation of the elements brings about a transfer of pieces of stock from a preheating stage on one element to a heating stage on the other element.

23. In a machine of the class described, an electrode, cooling liquid conveying and discharging ducts in said electrodes, a chamber in said electrode, a hollow metal contact piece screwed into said chamber, a disc like portion formed on said contact piece having a cylindrical contact surface, and a tube extending from one duct into said hollow contact piece, the other duct being connected to said chamber, whereby to effectively cool said contact piece.

ERNEST S. JEFFERIES.